United States Patent [19]

Tijssen

[11] 4,456,206
[45] Jun. 26, 1984

[54] FASTENING DEVICES FOR ATTACHING OF BUILT-IN ELEMENTS

[75] Inventor: Hartmut Tijssen, Fredenbeck, Fed. Rep. of Germany

[73] Assignee: Messerschmitt-Bölkow-Blohm Gesellschaft m.b.H., Munich, Fed. Rep. of Germany

[21] Appl. No.: 385,279

[22] Filed: Jun. 4, 1982

[30] Foreign Application Priority Data

Jun. 5, 1981 [DE] Fed. Rep. of Germany ....... 3122366

[51] Int. Cl.³ ............................................. B64D 11/00
[52] U.S. Cl. .................................. 244/118.5; 244/120; 244/131; 248/287; 248/188.8; 410/80; 410/127
[58] Field of Search ............... 244/118.1, 118.5, 118.6, 244/119, 120, 131; 403/4, 21, 408; 52/285; 248/188.8, 278, 279, 287, 677; 410/77, 78, 80, 81, 94, 95, 127, 129

[56] References Cited

U.S. PATENT DOCUMENTS

| | | | |
|---|---|---|---|
| 2,345,650 | 4/1944 | Attwood | 403/21 |
| 2,843,872 | 7/1958 | Hannon | 248/287 |
| 3,266,756 | 8/1966 | Hammond et al. | 244/131 |
| 3,473,431 | 10/1969 | King, Jr. | 403/408 |
| 3,528,165 | 9/1970 | Williams et al. | 244/119 |
| 3,912,206 | 10/1975 | Jong | 244/118.1 |
| 4,035,093 | 7/1977 | Redshaw | 403/408 |
| 4,061,298 | 12/1977 | Kober | 248/677 |
| 4,185,799 | 1/1980 | Richards, Jr. | 244/118.5 |

*Primary Examiner*—Trygve M. Blix
*Assistant Examiner*—Rodney Corl
*Attorney, Agent, or Firm*—Horst M. Kasper

[57] ABSTRACT

A connecting device is provided in aircraft for attaching of built-in elements such as galley and lavatory walls, storage cabinets and the like to structural parts of the airframe. The connecting device meets the special requirements of aircraft construction, reliably prevents corrosion at the structure and at the same time allows for an adjustment for balancing tolerances. The connecting device is constructed such that the individual elements of the connecting device can be combined to each other, that the built-in elements can be adjusted in their position regarding the x-, y-, and z-directions, that as desired space can be provided above the floor level and that the connection bores of the structure are provided with sealing rings.

15 Claims, 9 Drawing Figures

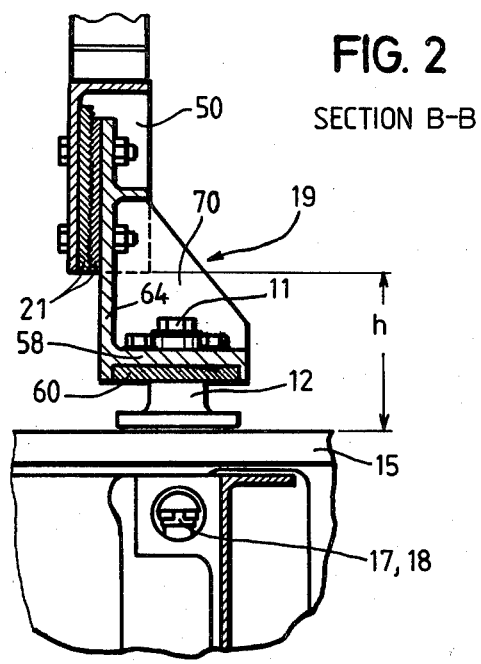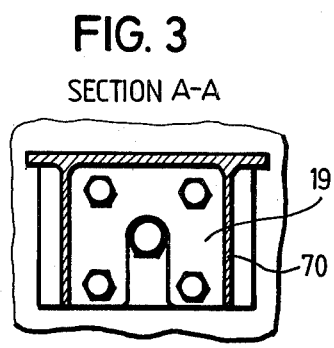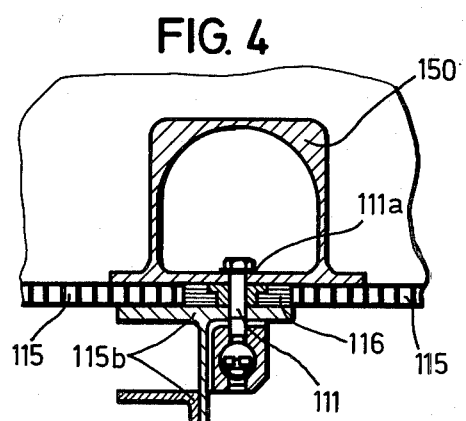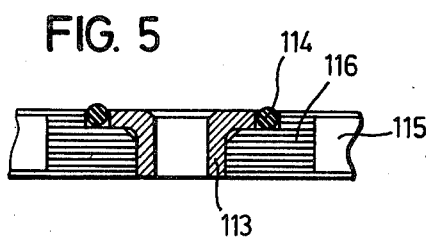

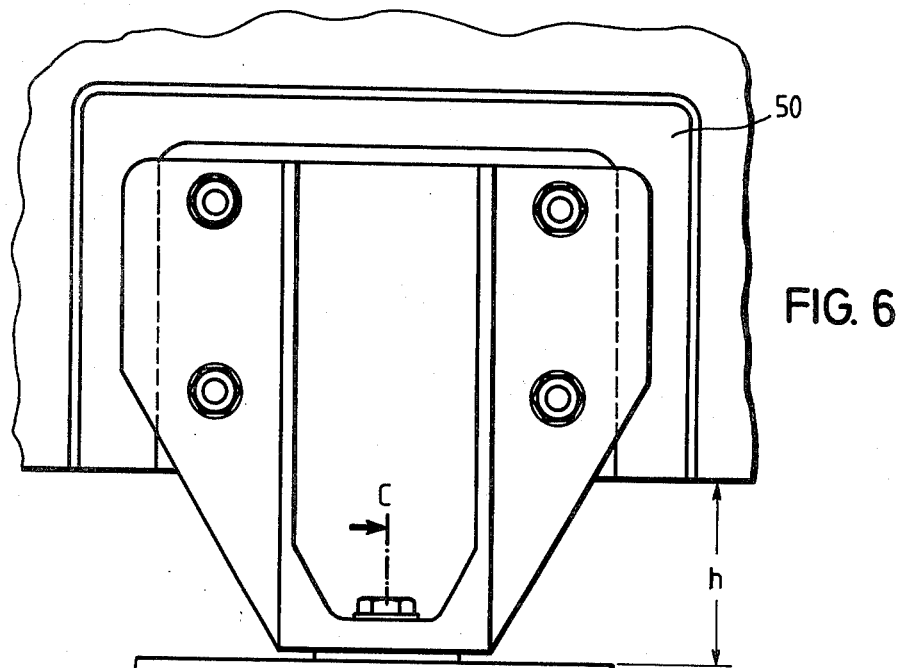
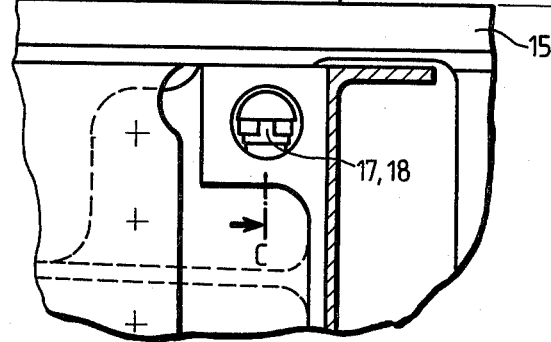
FIG. 6
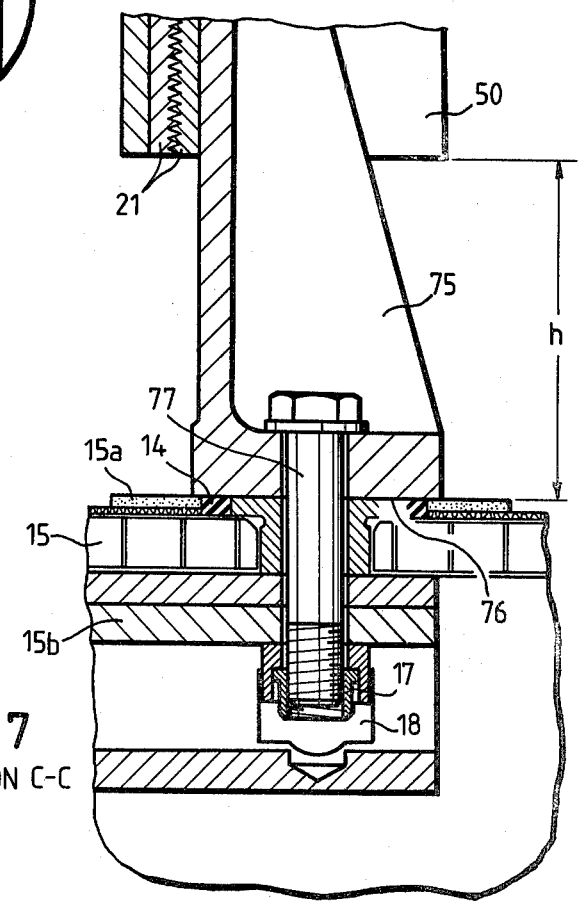
FIG. 7
SECTION C-C

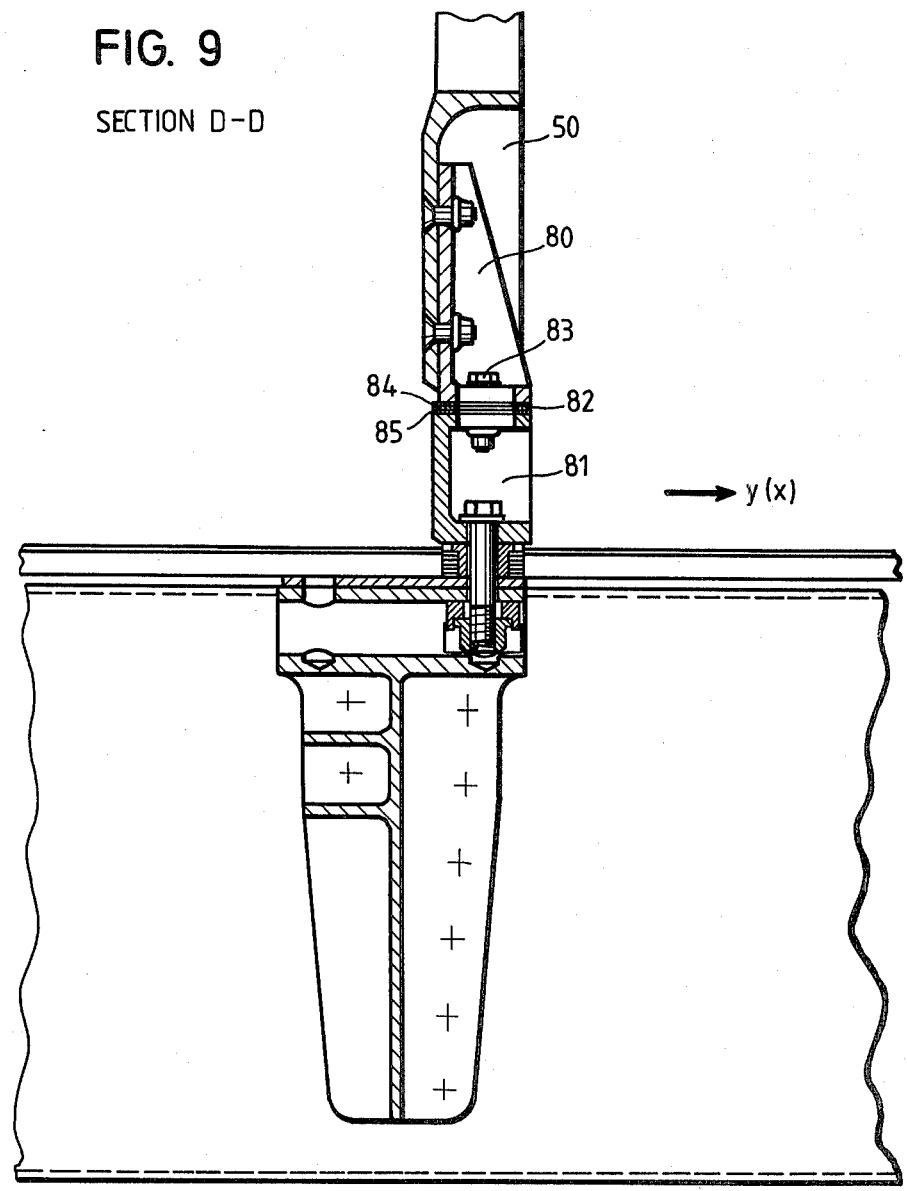

FASTENING DEVICES FOR ATTACHING OF BUILT-IN ELEMENTS

DESCRIPTION

BACKGROUND OF THE INVENTION

1. Field of the Invention

The present invention relates to a fastening and connecting provision for attaching of built-in elements such as galley and lavatory walls, storage cabinets and the like in aircraft to structural parts of the airframe.

2. Brief Description of the Background of the Invention Including Prior Art Connection and fastening elements of a variety of kinds and forms are known. For example such elements are disclosed in Swedish Pat. No. 338,144. All these embodiments have proven to be more or less useful, however they are predominantly intended and conceived for special applications. However, in aircraft construction such as for the connection of built-in elements of for example galley walls, lavatory walls, and space cabinet walls, substitute seats, storage cabinets and the like, the known provisions are associated with some disadvantages, of which the relative early and extensive corrosion at the structural parts of the airframe is the most serious and heavy factor. Conventionally, it was attempted to avoid this by attaching the as construction kits prefabricated lavatories, galleys and so on to so-called seat rails on the floor frame. However, the corrosion at the support and contact surfaces as well as at the connecting elements could not be substantially reduced in this manner and therefore frequently substantial loss in time and labor or respectively idle periods of the aircraft occurred during maintenance and servicing. The high demounting and remounting expenditures resulted in long idle periods of the aircrafts.

SUMMARY OF THE INVENTION

1. Purposes of the Invention

It is an object of the present invention to provide a connecting element of the kind set forth above which meets the requirements of aircraft construction and which is reliable and stable against corrosion at the structural parts.

It is another object of the present invention to provide a connecting element which substantially simplifies the maintenance work and mounting procedures of the aircraft facilities.

It is a further object of the present invention to provide a connecting element which allows at the same time to adjust the position of the built-in elements for balancing tolerances.

These and other objects and advantages of the present invention will become evident from the description which follows.

2. Brief Description of the Invention

The present invention provides a fastening provision for attachment of built-in elements which comprises built-in elements for providing space separation means, a support structure having a connection bore opening, a sealing element disposed about the connection bore opening and connecting elements combined in such way that the built-in elements can be adjusted in their position relative to the the x-, y-, and z- directions.

Preferably the built-in elements provide galley and/or lavatory walls, storage cabinets or the like. In general, the built-in elements are attached in an aircraft to structural parts of the airframe. The connecting elements can comprise a bushing disposed in the bore hole, which can be contacting the sealing element. A bolt can provide a support or distance element and the thread of the bolt can be guided by the bushing. A cylinder nut can hold part of the bolt to below the top level of the support structure. A spacer or guide collar can surround the shank of the bolt and a support mounting can be attached to the collar.

Preferably, a first toothed rack plate can be attached to the support mounting and a second toothed rack plate can be attached to the built-in element and be disposed at a connecting surface located opposed to the first toothed rack plate. The connecting surfaces or respectively the attachment points of the built-in elements can be provided with cross-slots or a larger bore at the built-in element for adjusting the x- and z-direction and with longitudinal slots at the floor structure plate for providing an adjustment in the y-direction. The toothed rack plate can be provided with engaging elements having a grid element width of from about 0.5 millimeters to 2 millimeters. The regions of adjustment in the directions x, y, and z can range from about plus-minus 5 millimeters to about 2 millimeters.

There is also provided a method for attaching built-in elements to structural parts of airframes which comprises providing a bore hole in a support structure, disposing a sealing element around the bore hole, placing a cylinder nut and a retention spring below the bore hole, attaching a support mounting to a built-in element, and engaging the support mounting with a bolt for fastening the same to the nut after insertion through the bore hole.

A collar can be disposed between the support structure and the support mounting for providing a spacer and/or support. The position of the built-in element can be adjusted by the relative positioning of the support mounting. Preferably, the adjustment of the relative position of the built-in elements is provided by motion along cross slots and/or longitudinal slots.

Thus the present invention provides a connecting element, which not only gives an optimum protection for the structure, but which also shortens substantially inspection, maintenance and servicing times and which allows for easy substitution of elements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 2 is a sectional view along the section line B—B of FIG. 1, where the x-, and y-loads are taken, FIG. 3 is a sectional view along section line A—A of FIG. 1, FIG. 4 is a sectional view through an embodiment without maintaining of a spacer distance, FIG. 5 is a sectional view through the sealed bearing bushing according to FIG. 4, FIG. 6 is a sectional view of a further embodiment without maintaining of a spacer distance, FIG. 7 is a sectional view taken along section line C—C of FIG. 6, FIG. 9 is a sectional view taken along line D—D in FIG. 8.

DESCRIPTION OF INVENTION AND PREFERRED EMBODIMENTS

In accordance with the present invention there is provided a fastening provision for attaching of built-in elements such as galley and lavatory walls, storage cabinets and the like in aircraft to structural parts of the airframe. The individual elements 11–21 of the fastening provision 10 are combined and connected to each other such that the built-in elements 50 are adjustable in the x-, y-, and z-directions and which as desired provide a height spacing above the floor connection and which are provided in the connection bores of the structure 15a-b with seals 14.

Figure 1:
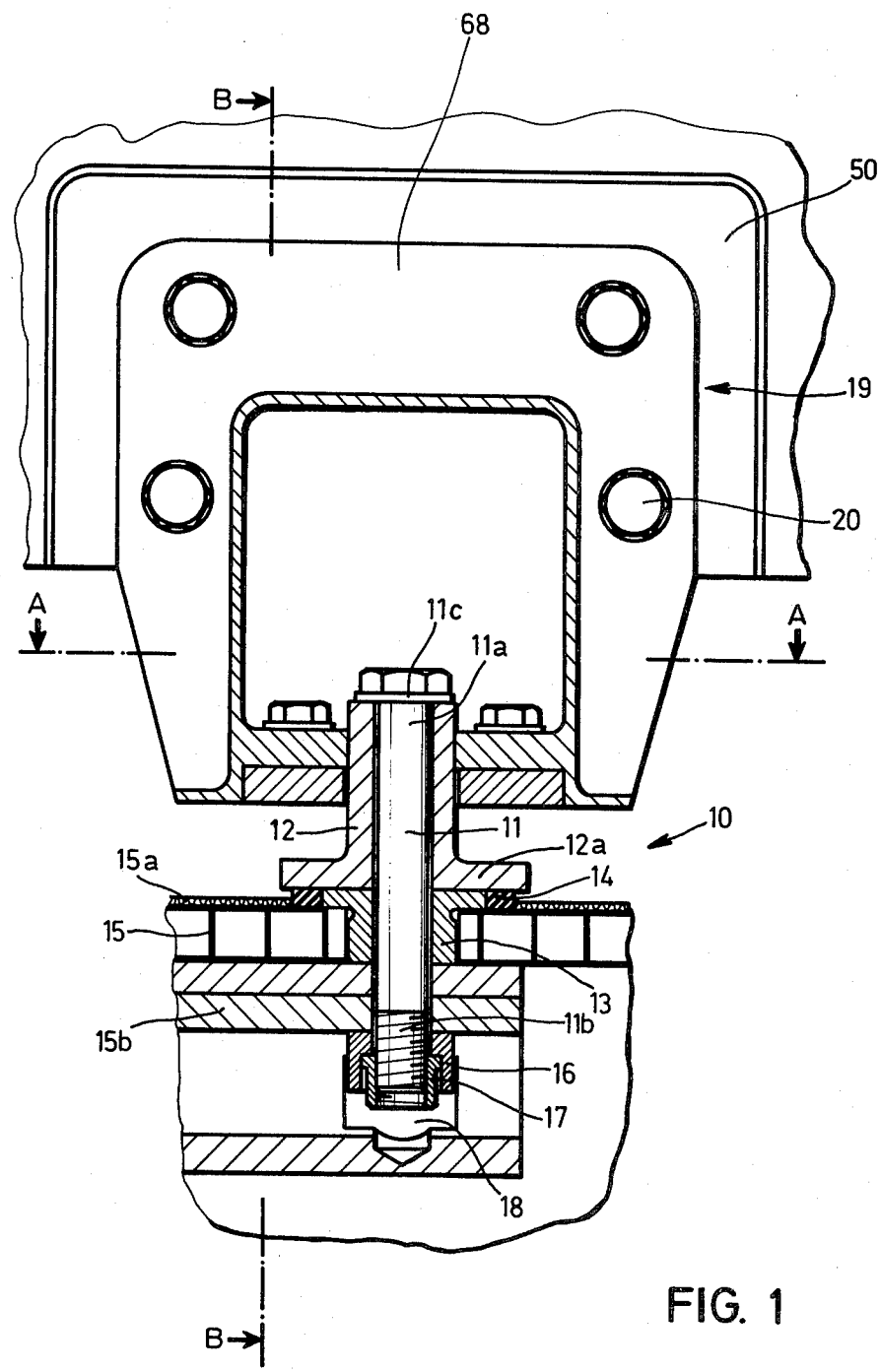
FIG. 1 is an in part sectional view through an embodiment with spacer provision, where only the loads in x- and y-direction are shown.
Figure 8:
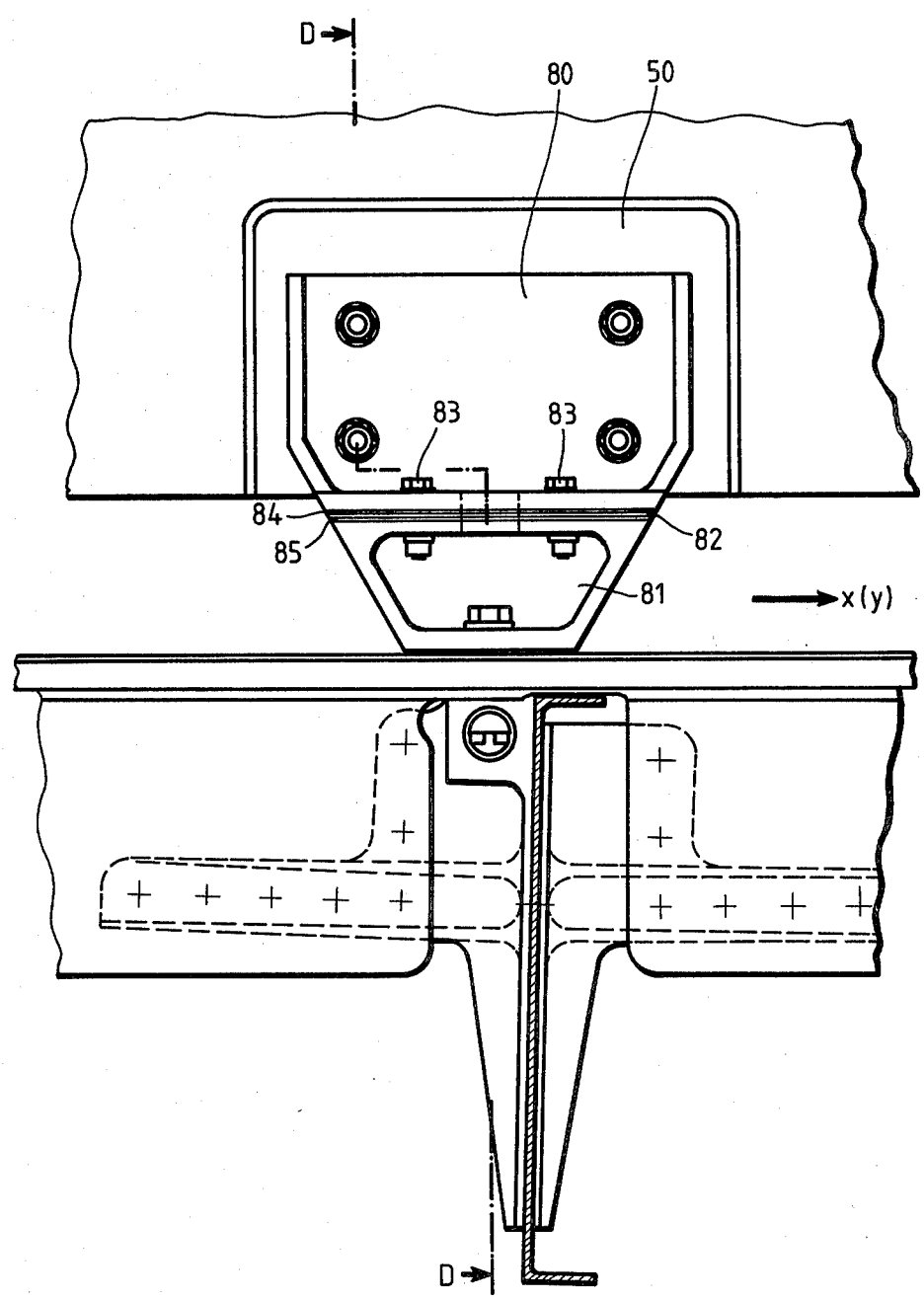
FIG. 8 is a still further embodiment without maintaining a spacer distance.

The z-coordinate direction runs from the bottom of FIGS. 1 and 2 to the top of the respective figure, the x-coordinate direction runs from the left of FIG. 1 to the right side of the figure, and the y-coordinate direction runs from the left of FIG. 2 to the right side of the figure.

The support and if desired the distance spacer element are provided by a bolt 11, the thread part of which 11b is guided in a bushing 13 provided with a seal ring 14 and which is kept in position by way of a cylinder nut 17 and a support spring 18 at the floor plate 15. The shank 11a of the bolt 11 can have coordinated a spacer or guide collar 12, 12a and a support mounting 19 for the built-in element 50.

Referring now to FIG. 1 there is shown an embodiment of a connection element 10, which is floating in z-direction where a bolt with thread serves as a central support and carrying part. This bolt 11 is guided by a spacing collar providing a liner 12, the flange rim 12a of which rests on the bushing 13 sealed by a sealing ring 14 with the airframe floor plate 15. The floor plate 15 is provided at its surface with a fiberglass deposit 15a. This fiberglass deposit 15a in connection with the sealing ring 14 prevents the penetration of liquids into the cell structure 15b and thereby its corrosion. The lower thread part 11b of the bolt 11 is provided with a self-locking cylinder nut 17 and with a support spring 18. A disk 11c from a sealing material can be provided for the bolt 11 in a conventional manner.

The spacer liner 12 and the upper part 11a of the bolt 11 take a support mounting 19, the form and construction of which is shown in FIGS. 1 to 3. The support mounting 19 can exhibit the general shape of a bracket with possible additional reinforcements. In particular the support mounting 19 can have a horizontal planar section 58 with a reinforcement 60. The horizontal planar section 58 can be solidly atached to the rim 12a of the liner 12. The second face 64 of the support mounting 19 can carry a toothed rack plate 21. The second face can also extend to an outward flange 68, which can be provided with elements 20 to provide a solid connection to the built-in element 50. Furthermore, reinforcing ribs 70 can be provided to strengthen the stability of the support mounting 19. Preferably, the support mounting 19 is constructed from aluminum metal or from an aluminum alloy.

As the support mounting 19 has coordinated a toothed rack plate 21 on the side toward the built-in element 50 to be connected and to be supported and such a toothed rack plate 21 is also coordinated to the built-in element 50. The toothed rack plates have a grid of preferably from about 0.5 to 2 millimeters such as for example of 1 millimeter and in connection with cross slots or with a larger bore at the built-in element 50 and with longitudinal slots at the floor structure 15 they allow ranges of adjustment in the x-, y-, and z-directions of from about plus-minus 2 to about plus-minus 5 millimeters. 22 to 25 millimeters are sufficient as a spacer distance from the floor 15 in order to prevent corrosion or respectively in order to provide a sufficient and adeaquate possibility of cleaning.

The embodiment shown in FIGS. 4 and 5 represents a fastening connection where no space is provided between the floor plate 15 and the built-in element 150 to be connected. In this case, a wide ring 116 of fiber reinforced plastics, is inserted into the receiving bore hole of the floor plate, which in its hole axis supports a guide bushing 113, which in turn is sealed with a sealing ring 114 with respect to the bore hole. The bolt 111 is composed as described for bolt 11 in FIG. 1 and is provided with a sealing ring 111a. The structural parts 115b of the aircraft, the floor plate and the built-in element 150 are completely sealed at their adjoining faces and relative to their connection bore hole. Adjustment screws can be employed for balancing the tolerances.

It will be understood that each of the elements described above, or two or more together, may also find a useful application in other types of transportation systems, fastening applications and connecting mechanisms differing from the types described above.

While the invention has been illustrated and described as embodied in the context of a fastening provision for built-in walls to airframes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fastening provision for attachment of built-in elements comprising
   built-in elements for providing space separation means;
   a support structure having a connection bore opening;
   a sealing element disposed about the connection bore opening; and
   connecting elements combined in such a way that the built-in elements can be adjusted in the x-, y-, and z-directions and including
   a bushing disposed in the bore opening and contacting the sealing element;
   a bolt providing a support and/or distance element having its thread guided by the bushing;

a spacer guide collar surrounding the shank of the bolt; and a support mounting attached to the collar.

2. The fastening provision according to claim 1 wherein the built-in elements provide galley and lavatory walls, storage cabinets or the like.

3. The fastening provision according to claim 2 wherein the built-in elements are attached in an aircraft to structural parts of the airframe.

4. The fastening provision according to claim 2 wherein the connecting elements further comprise a cylinder nut holding the bolt to below the level of the support structure; and a retainer spring for keeping the cylinder nut in a confined area.

5. The fastening provision according to claim 1 further comprising a first toothed rack plate attached to the support mounting; and a second toothed rack plate attached to the built-in element and disposed at a connecting surface opposed to the first toothed rack plate.

6. The fastening provision according to claim 5 wherein the connecting surfaces are provided with cross-slots or with a larger bore at the built-in element for adjusting the x-and z- direction and with longitudinal slots at a floor plate for providing an adjustment in the y-direction.

7. The fastening provision according to claim 5 wherein the attachment points of the built-in elements and of the connecting elements are provided with cross-slots or with a larger bore at the built-in element for adjusting the x- and z- direction and with longitudinal slots at a floor plate for providing an adjustment in the y-direction.

8. The fastening provision according to claim 1 further comprising toothed rack plates provided with engaging elements having a grid element width of from about 0.5 to 2 millimeters.

9. The fastening provision according to claim 1 wherein the regions of adjustment in the directions x, y, and z range from about plus-minus 5 millimetrs to plus-minus 2 millimeters.

10. A method for attaching built-in elements to structural parts of airframes comprising providing a bore hole in a support structure;

disposing a sealing element around the bore hole;
setting a bushing in the bore hole and contacting the sealing element;

attaching a support mounting to a built-in element with the built-in element disposed such as to provide space separation means; and engaging the support mounting with a bolt providing a support and/or distance element having a spacer guide collar surrounding its shank for fastening the same to a nut after insertion through the bore hole such that the built-in elements can be adjusted in the x-, y-, and z-directions.

11. The method for fastening of built-in elements to structural parts of airframes according to claim 10 further comprising adjusting the position of the built-in element by the relative positioning of the support mounting.

12. The method for fastening of built-in elements to structural parts of airframes according to claim 11 wherein the adjustment of the relative position of the built-in elements is provided by motion along cross slots.

13. The method for fastening of built-in elements to structural parts of airframes according to claim 11 wherein the adjustment of the relative position of the built-in elements is provided by motion along cross slots and longitudinal slots.

14. The method for fastening of built-in elements to structural parts of airframes according to claim 11 wherein the adjustment of the relative position of the built-in elements is provided by motion along longitudinal slots.

15. The method for fastening of built-in elements to structural parts of airframes according to claim 10 further comprising placing a cylinder nut and a retention spring below the bore hole for fastening the bolt.

* * * * *